Figure 1:
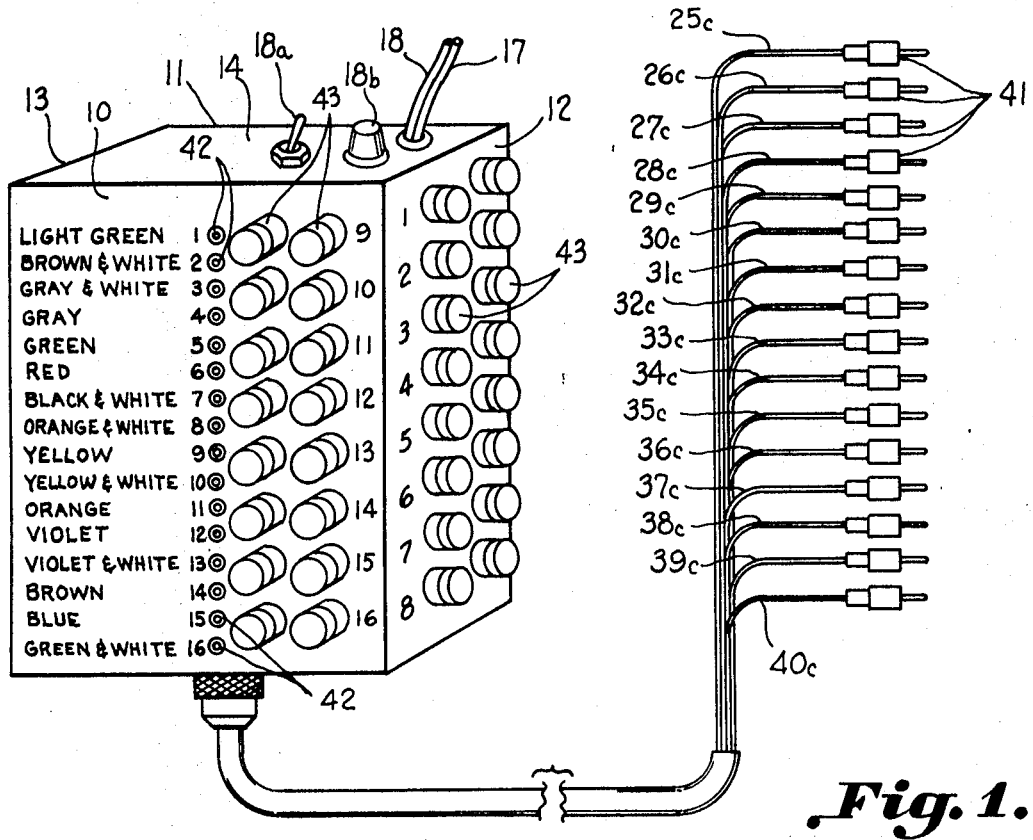

United States Patent

[11] 3,609,740

| [72] | Inventors | T. O. Paine<br>Administrator of the National Aeronautics and Space Administration with respect to an invention of;<br>Robert B. Martin, Satellite Beach; Eddie L. Brawner, Cape Canaveral; Wayne E. Pate, Orlando, all of Fla. |
|---|---|---|
| [21] | Appl. No. | 856,327 |
| [22] | Filed | Sept. 9, 1969 |
| [45] | Patented | Sept. 28, 1971 |

[54] COLOR PERCEPTION TESTER
2 Claims, 2 Drawing Figs.

[52] U.S. Cl. ..................................... 340/279,
35/8, 324/66
[51] Int. Cl. ..................................... G08b 21/00,
G09b 1/00
[50] Field of Search ............................. 340/279;
35/8, 9; 324/66; 209/111.6

[56] References Cited
UNITED STATES PATENTS

| 1,647,276 | 11/1927 | Daman | 35/9 R X |
| 2,442,014 | 5/1948 | Myers | 35/9 R X |
| 2,541,172 | 2/1951 | Milman | 35/9 R |
| 3,349,503 | 10/1967 | Levin | 35/8 R |
| 3,480,856 | 11/1969 | Scott | 324/66 X |

*Primary Examiner*—John W. Caldwell
*Assistant Examiner*—Scott F. Partridge
*Attorneys*—James O. Harrell and G. T. McCoy ABSTRACT: A color perception tester for testing individuals in order to determine if the individual can correctly identify wires in accordance with their respective color code. The tester includes a plurality of colored wires, which, when plugged in the appropriate receptacle or plug, will cause a pair of adjacent lamps to be illuminated. Indicia is printed adjacent the plug identifying the proper colored wire which should be plugged in the circuit.

INVENTORS.
ROBERT B. MARTIN
EDDIE L. BRAWNER
& WAYNE E. PATE
BY
James O. Harrell
ATTORNEYS.

COLOR PERCEPTION TESTER

The invention described herein was made in the performance of work under a NASA contract and is subject to the provisions of Sections 305 of the National aeronautics and Space Act of 1958, Public Law 85—568 (72 Stat. 435, 42 U.S.C. 2457).

This invention relates to a color perception tester, and more particularly to a color perception tester in which an individual can readily be tested to see if he can identify wires in accordance with their respective color codes.

The standard wiring methods require personnel with the capability to rapidly and accurately identify a large number of individual colors and color combinations. This is especially true, when the individual is wiring complicated circuits which normally are included in items such as, space vehicles, communication systems, computers, etc. If such items are wired incorrectly, there is a chance that the equipment associated therewith, could be damaged plus it is time consuming and expensive to correct such faults.

Therefore, it is desirable that a simple and effective color perception tester be provided whereby an individual can be tested by an unskilled examiner in such a manner as to positively determine his ability to rapidly identify specific color coding of electrical conductors. This tester should overcome the difficulties experienced with standard testers for color blindness, wherein an individual with proven capability for specific color code recognition is frequently classified as partially color blind and incapable of performing the required color code identification.

In accordance with the present invention, it has been found that difficulties encountered in testing apparatus used, heretofore, for testing color perception may be overcome by providing a novel color perception tester. This color perception tester includes the following basic parts: (1) a source of power, (2) a plurality of electrical circuits, (3) each of the circuits including a first and second branch, one side of each of the branches being coupled to the source of power, (4) a plurality of predetermined color coded wires, each having one end attached to the other side of one of the first branches, (5) an electrical male connector plug connected to the other end of each of the wires, (6) an electrical female connector plug connected to the other side of each of the second branches, (7) indicia printed adjacent each circuit for identifying the proper color coded wire for the respective circuit, (8) a signal lamp electrically connected in each branch of each circuit so that when the individual being tested plugs the correct color coded wire in a female connector according to the indicia printed adjacent the circuit, both of the lamps in the circuit are illuminated.

Accordingly, it is an important object of the present invention to provide a color perception tester for testing an individual in order to determine if the individual can correctly identify wires in accordance with their respective color codes.

Another important object of the present invention is to provide a color perception tester, the use of which can be administered by an individual of normal intelligence without special training.

Figure 2:
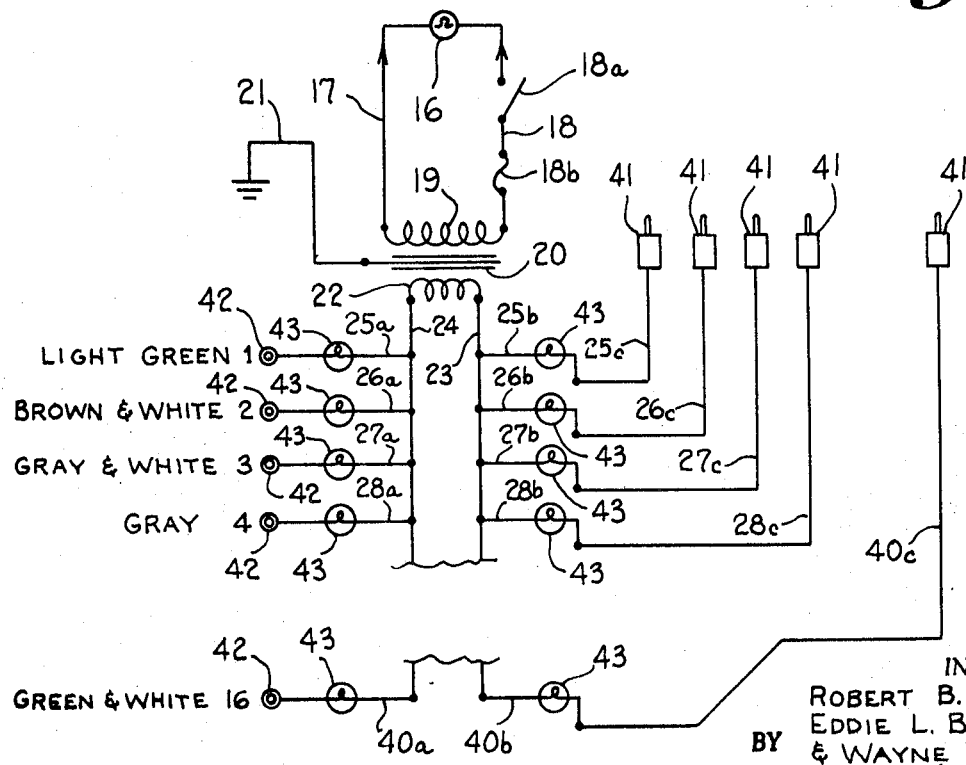

Other objects and advantages of this invention will become more apparent from a reading of the following detailed description and appended claims taken in conjunction with the accompanying drawing wherein:

FIG. 1 is a perspective front view illustrating a color perception tester constructed in accordance with the present invention, and FIG. 2 is a schematic diagram of the electrical circuit for the color testing apparatus.

Referring in more detail to FIG. 1 of the drawing, the color perception tester is housed within a metallic box defined by a front and rear wall 10 and 11, respectively, which are joined by sidewalls 12 and 13. The front and sidewalls are joined by a top 14 and bottom (not shown).

The color perception tester may be powered by any suitable source of power, such as a 115 volt AC supply 16, which is connected through leads 17 and 18 to a primary winding 19 of a step down transformer 20. Manually operated switch 18a and protective fuse 18b are positioned in lead 18 between the power supply 16 and transformer 20. The step down transformer 20 and the housing are grounded through lead 21 to any suitable ground so as to minimize the possibility of being shocked while operating the tester. A secondary winding 22 of the transformer has one side connected to lead 23, while the other side is connected to lead 24. A plurality of electrical circuits are coupled to leads 23 and 24, each circuit includes a first and second branch 25a and 25b through 40a and 40b. One side of each of the branches 25a through 40b is coupled to the source of power through leads 23 and 24 and the transformer 20.

A plurality of predetermined color coded wires 25c through 40c are each attached to the other end of respective first branches 25b through 40b. An electrical male connector plug 41 is connected to the other end of each of the wires 25c through 40c. A complementary electrical female connector 42 is electrically connected to the other side of each of the second branches 25a through 40a.

Indicia is printed adjacent each of the circuits labeled 1 through 16 consecutively, on the front wall of the tester for identifying the proper color coded wire for the respective circuit. For example, adjacent circuit 1 the light green wire 25c should be plugged into the female receptacle 42 associated with circuit 1. For circuit 2 the brown and white wire 26c should be plugged in the female receptacle associated with circuit 2.

Each of the branches 25a through 40a and 25b through 40b have a signal lamp 43 interposed therein. The signal lamps for a particular circuit are positioned adjacent each other as shown in FIG. 1, so that when the individual being tested plugs the correct color coded wire 25c through 40c into the female receptacle 42, which is identified by the indicia that corresponds to the color of the wire, then both of the signal lamps for that particular circuit are illuminated. This is due to the fact that a parallel circuit is completed through the secondary winding 22, a first and second branch 25a and 25b (that is if the light green wire was plugged in) and the light green wire 25c. If the individual being tested plugged the light green wire 25c in any of the female receptacles associated with a branch other than branch 25a, then the signal lamp 43 in branch 25b would be illuminated with the signal lamp in a branch of another circuit. Such indicates that the individual being tested cannot properly select color coded wires.

A step down transformer is utilized in order to put a low voltage on the wires 25c through 40c so as to minimize the possibility of an electrical shock while performing the test.

If it is desired, the indicator lamps 43 may be physically located so that the individual being tested cannot see the results of his selection.

While a preferred embodiment of the invention has been described using specific terms, such description is for illustrative purposes only, and it is to be understood that changes and variations may be made without departing from the spirit or scope of the following claims:

1. A color perception tester for testing an individual in order to determine if the individual can correctly identify wires in accordance with their respective color code comprising:
   A. a source of power;
   B. a plurality of electrical circuit;
   C. each circuit including, a first and second branch, one side of each of said branches being coupled to said source of power,
   D. a plurality of predetermined color coded wires each having one end attached to the other side of one of said first branches,
   E. an electrical male connector plug connected to the other end of each of said wires,
   F. an electrical female connector connected to the other side of each of said second branches,
   G. indicia printed adjacent each circuit for identifying the proper color coded wire for the respective circuit, and H. a signal lamp electrically connected in each branch of each circuit, so that when the individual being tested plugs the correct color coded wire in a female connector according to the indicia printed adjacent a circuit both lamps in said circuit are illuminated.

2. The color perception tester as set forth in claim 1, wherein said source of power comprises:

A. a step down transformer having a primary and secondary winding,

B. a voltage source coupled to the primary winding, and

C. said branches being coupled to secondary winding of said transformer which has potential thereon that is sufficient to illuminate said lamps but does not present a hazard with regard to electrical shocks.